UNITED STATES PATENT OFFICE.

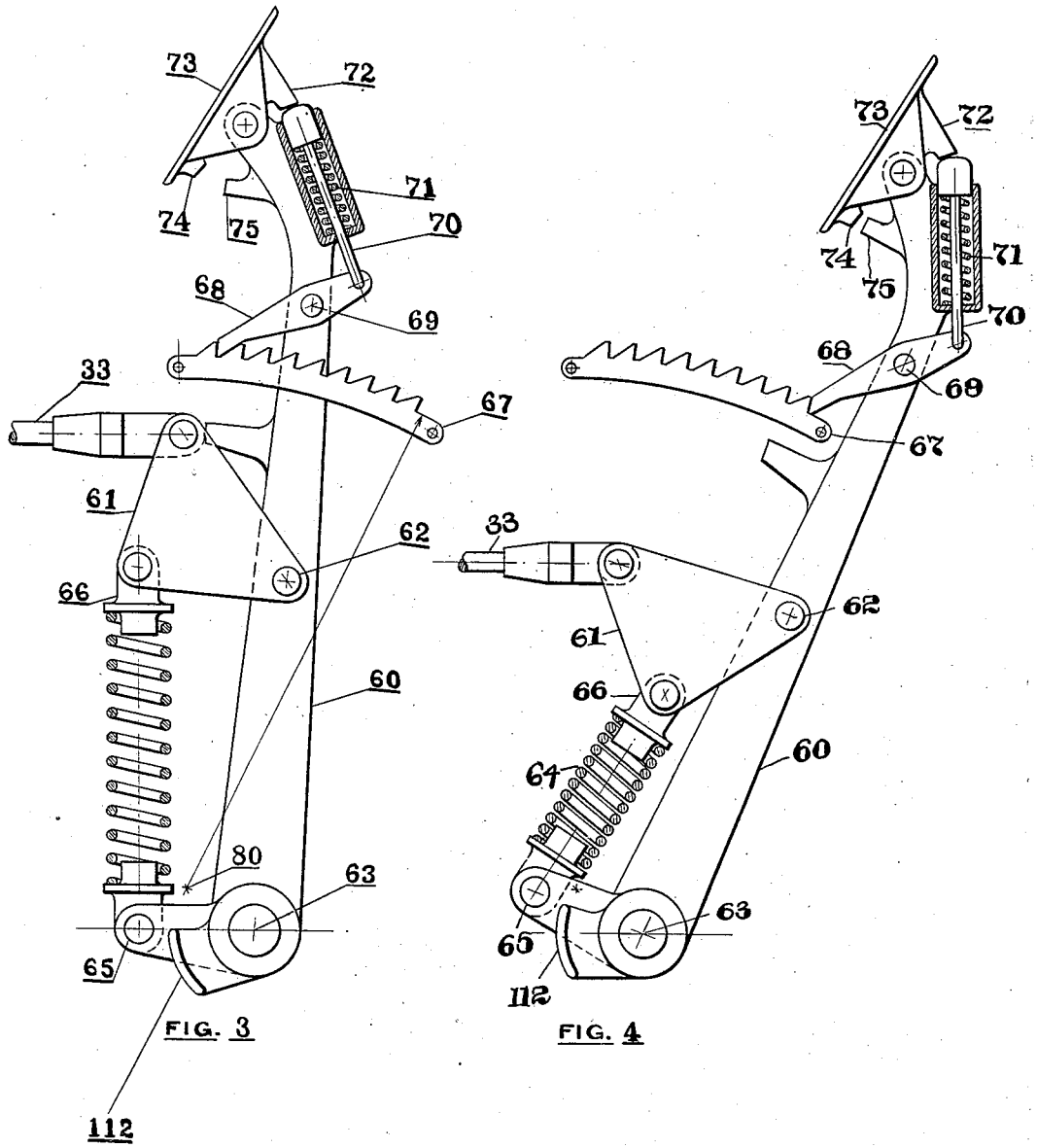

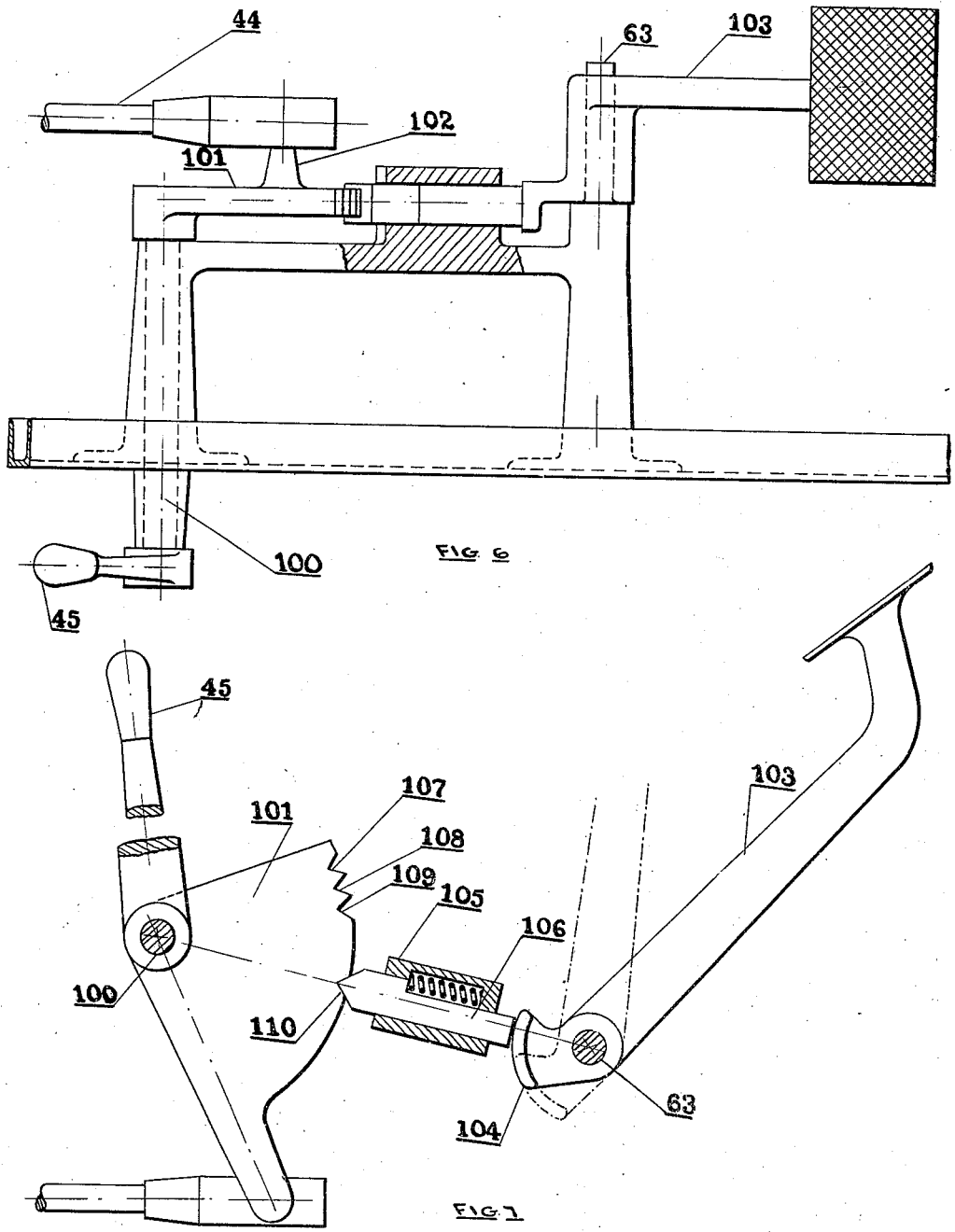

FRANK D. HOWE, OF WALTHAM, MASSACHUSETTS, ASSIGNOR TO WALTHAM MFG. COMPANY, OF WALTHAM, MASSACHUSETTS, A CORPORATION OF MAINE.

CONTROLLING MECHANISM FOR MOTOR-VEHICLES.

No. 896,298.　　　Specification of Letters Patent.　　Patented Aug. 18, 1908.

Application filed February 1, 1908. Serial No. 413,780.

*To all whom it may concern:*

Be it known that I, FRANK D. HOWE, a citizen of the United States, residing at Waltham, in the county of Middlesex and State of Massachusetts, have invented an Improvement in Controlling Mechanism for Motor-Vehicles, of which the following description, in connection with the accompanying drawings, is a specification, like letters on the drawings representing like parts.

This invention relates to power transmission, speed control and the like and pertains more particularly to the control of motor vehicles.

Among other objects, the invention is designed to provide simple, effective and convenient controlling mechanism, whereby the starting and stopping, reversing and speeds of travel of a motor vehicle may be governed.

The character of the invention may be best understood by reference to a concrete embodiment exhibited in the accompanying drawings for purposes of illustration.

Figure 1:
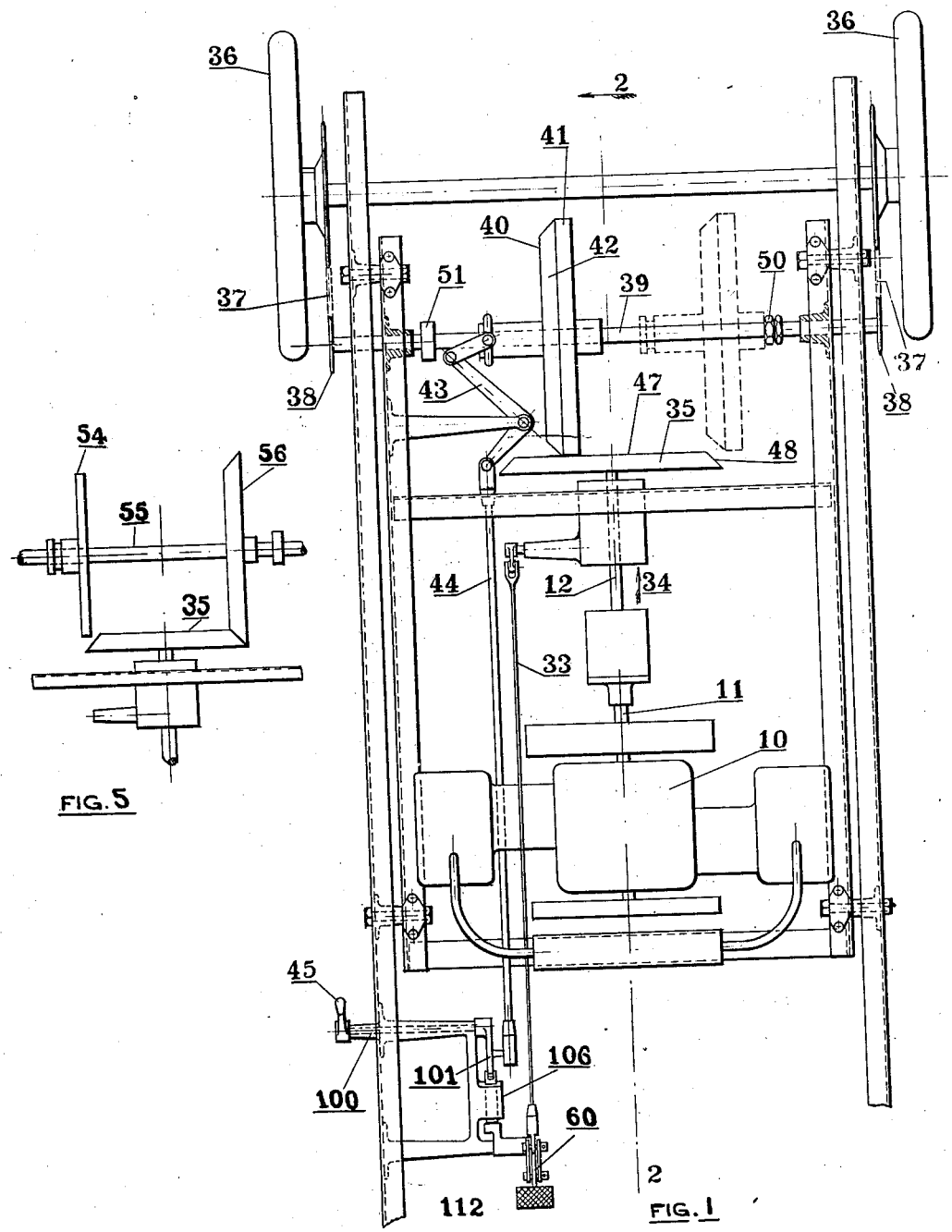
Figure 2:
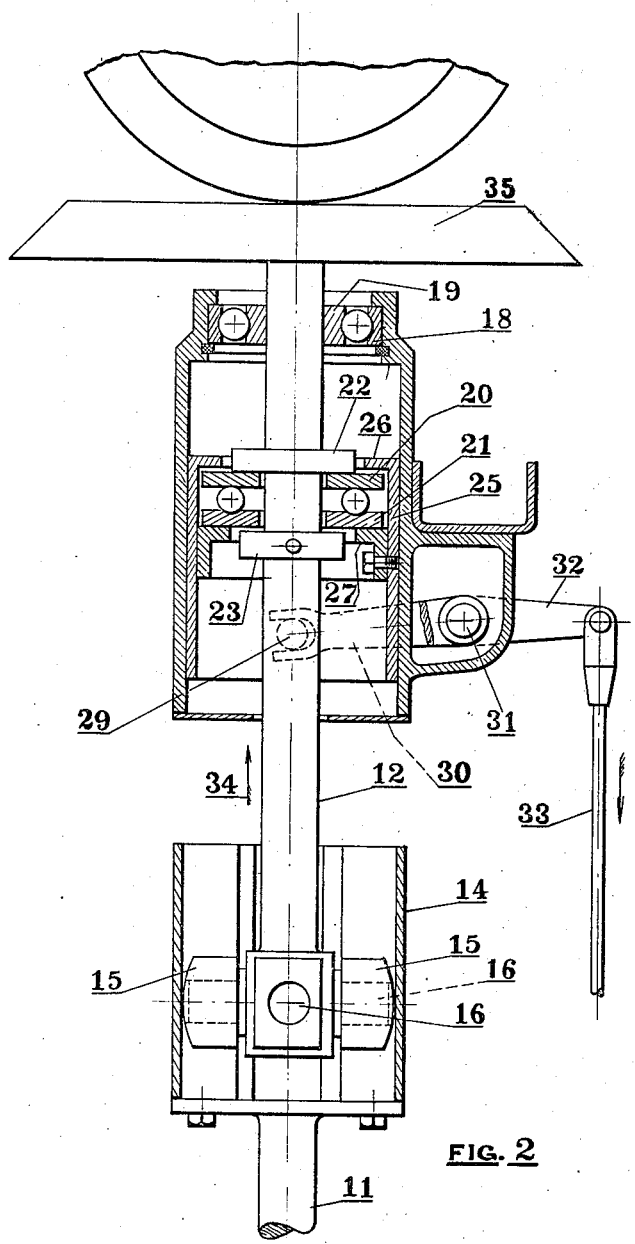

In the drawings:—Figure 1 is a plan view of an automobile chassis showing mechanism embodying this invention in its assembled position to coöperate with parts of an automobile; Fig. 2 is a longitudinal section on the line 2—2 of Fig. 1; Fig. 3 is a side elevation of treadle mechanism in its normal position when the driving system of the machine is disengaged from the driven system; Fig. 4 is a similar view showing the treadle mechanism in its active position when the driving and driven systems are engaged for driving the machine; Fig. 5 is a longitudinal section showing a modification of the mechanism of Fig. 2. Fig. 6 is a horizontal plan, partly in section, of an interlocking mechanism; and Fig. 7 is a side elevation, partly in section, of the parts shown in Fig. 6.

Referring to Fig. 1 the driving mechanism of the automobile comprises a motor 10, of any practicable sort having a power shaft 11. The shaft 11 is connected by a slip joint with a co-axial shaft 12. For the purposes of the specific illustrative mechanism, it is desired that the shaft 12 be capable of axial movement, while continuing in driving relation with the power shaft 11; and the slip joint referred to serves this purpose. It is by no means necessary to employ a slip joint, since any practicable means for communicating power from the shaft 11 to the shaft 12 may be used.

As shown in Fig. 2, the power shaft 11 has a rigid sleeve 14, containing a plurality of slide-ways for blocks 15, the latter being pivotally mounted upon pins or studs 16, fixed in the shaft 12. Preferably the blocks 15 are so related to the shaft 12 and sleeve 14 that they supply a snug bearing between the former and latter, which serves to support the proximate end of the shaft 12. The shaft 12 is elsewhere supported in a ball bearing 18, preferably rigid with the frame of the chassis. It is preferred that the journal for the ball bearing 18 be stationary on the frame, without partaking of any axial movement of the shaft 12, since with such an arrangement the alinement of the journal may be assured with greater accuracy and with less tendency to bind than when a journal is supplied by an axially movable sleeve or similar expedient which may accompany the shaft in its endwise movement. Moreover with the single stationary ball bearing a failure in accuracy of alinement is comparatively immaterial. In the specific illustration the shaft 12 is arranged to slide through a sleeve 19 of the ball bearing 18.

The shaft 12 is moved axially through the agency of a ball-thrust-bearing comprising disks 20 and 21, having a series of balls between them, interposed between collars 22 and 23, fixed on the shaft. The disks 20 and 21 rest within an axially movable sleeve 25, said disks being confined in said sleeve 25 by an annular flange 26 at one end of said sleeve and a collar 27 fixed in the interior of the sleeve. With this arrangement axial movement of the sleeve 25 moves the shaft 12 through the ball-thrust-bearing. It is preferred as illustrated in Fig. 2, that the shaft 12 have no material lateral contact with the ball-thrust-bearing or any of its parts; so the latter is merely a thrust bearing and in no sense a journal.

By means of studs 29 the sleeve 25 is pivotally engaged with a shaft controlling yoke 30, fulcrumed at 31, upon the frame of the chassis and having its operating arm 32 pivoted to a treadle operated link 33. When the treadle is depressed the link 33 is moved in the direction of the arrow in Fig. 2, moving the shaft 12 in the direction of the arrow 34 to engage a driving disk 35 on the end of the shaft with a driven member about to be described.

The rear wheels 36, 36 of the motor vehicle are preferably independently driven through sprocket chains 37, 37, by sprockets 38, 38, mounted on opposite ends of a driven shaft 39, suitably journaled on the chassis. Splined on the shaft 39 is a driven member 40, having a cylindrical bearing surface 41 and a frusto-conical bearing surface 42. The member 40 is axially movable on its shaft 39 by any practicable means, as, for example, a bell crank 43, linked to the hub of the member 40 and controlled by a link 44 and handle lever 45. The driving member 35 on the shaft 12 has a flat surface 47 to engage with the cylindrical bearing surface 41 of the member 40; and has a frusto-conical surface 48 to engage with the like surface 42 on the driven member 40. Normally, that is, when the motor vehicle is at rest, the driving and driven members 35 and 40 are disengaged, the shaft 12 being at the forward extreme of its movement and the driving and driven members being in any relation as may be determined by the operator. Under these conditions depression of the treadle moves the shaft 12 and driving member 35 axially, until the latter engages the driven member 40. The relative positions of the driving and driven members when in contact may determine the speeds at which the car will be driven. For example, if their contact be on the right of the axis of shaft 12 in Fig. 1 the car will be driven forward at a speed depending upon the distance of the point of contact from the axis. If they be engaged on the left of said axis, as illustrated in full lines in Fig. 1, the car will be driven reversely at a speed depending upon the distance of the point of engagement from the axis.

The described engagement between the driving member 35 and the cylindrical surface 41 of the driven member 40 provides true rolling contact on a single line only. While this is sufficient for the lower and intermediate driving speeds, it is preferable at the high speed to provide a more efficient transmission and accordingly provision is made for engaging the frusto-conical surfaces 42 and 48 of the driven and driving members, in order to supply a true rolling contact for driving at the high speed. When the driven member 40 occupies the dotted line position in Fig. 1, the driving member 35 may be moved rearwardly in any practicable manner and the result will be a bevel drive. Since this bevel drive at high speed is utilized during a very large percentage of the time (perhaps during more than 90% of the time) maximum driving efficiency is secured where most desired, while at the same time the disk and the roller supply all needed variations in speed, the greater slippage, friction and wear incidental to their comparatively infrequent use being of small consequence.

Preferably a stop 50 is provided, against which the driven member 40 may be moved on its shaft 39 to high speed position, said stop being adjustable and being herein represented as comprising a nut and lock nut. As the frusto conical surface 48 of the disk 35 wears, such wear may be taken up by adjustment of said nuts. A differential 51 of any suitable type may be provided, and if desired it may provide a stop against which the member 40 may be moved for high speed reverse position.

A practicable modification of the above described embodiment is shown in Fig. 5 wherein the driving member 35 may be engaged alternatively with a cylindrical surface driven member 54 splined to slide axially on a driven shaft 55; or a conical-surface driven-member 56 fixed upon the shaft 55. The diameter of the driven member 54 is such that when said member is engaged with the driving member 35, the latter is held at some distance from the high speed driven member 56.

In using the construction shown in Fig. 5, the driving member 35 may be disengaged from the driven member 54, and the latter removed to the extreme left in Fig. 5, preparatory to engaging the members 35 and 56 for a high speed.

To coöperate with a transmission and speed controlling mechanism embodying this invention, it is preferred to employ a treadle mechanism embodying features about to be described which are illustrated in Figs. 3 and 4.

Referring now to Fig. 3 the shaft controlling link 33 (see Figs. 1 and 2) is shown connected to a treadle lever 60, through the agency of a triangular link 61, pivoted to the treadle lever 60 at 62. The lever 60 is suitably fulcrumed to the chassis at 63. A compression spring 64 is interposed between a toe 65 of the treadle lever 60 and a seat 66 pivoted to the triangular link 61. A stationary toothed sector 67 is supplied to engage, and by its teeth to lock, a pawl 68, fulcrumed at 69 on the treadle lever 60. Pivoted to the tail of the pawl is a plunger 70, appropriately seated in the treadle lever 60 and provided with a spring 71, which tends normally to hold the pawl 68 in engagement with the teeth of the sector 67. The upper end of the plunger 70 stands in position to be depressed, for disengaging the pawl 68, by a lug 72 on the treadle 73. The latter is supplied with a suitable stop 74 to coöperate with an abutment 75 on the lever 60 to prevent complete displacement of the treadle.

Attention has been called to the fact that the machine may be started by moving the shaft 12 axially rearward until the driving member 35 engages the driven member 40, with the construction shown in Fig. 1. Obviously, if the driven member 40 stand in dotted line position of Fig. 1, the shaft 12 and driving member 35 will have to be moved through a greater distance to produce the engagement, than would be necessary if the driven member 40 stand in full line position or some other similar location. It is desirable, therefore, in the treadle mechanism to provide for two throws of different lengths. This provision is made in the illustrative treadle mechanism; but this invention permits either throw to be effected by a treadle movement of uniform extent. For example, if the treadle be moved clockwise in Fig. 3, the parts will remain in the positions there shown until the link 33 meets with some obstruction, as when the driving member enters into engagement with the driven member. Thereafter further movement of the treadle lever will tend to aline the link 33 with the pivot 62, with a leverage constantly increasing throughout the movement of the treadle lever, with a consequent decrease in the pressure otherwise demanded of the operator to produce the desired effect. As the link 33 approaches alinement with the pivot 62, the spring 64 is compressed by the normal operation of the parts.

After the link 33 has been finally arrested, the treadle lever may continue its travel, and such continued travel will be consumed in further compressing the spring 64, thereby augmenting the pressure between the driving and driven members. Obviously, if the link 33 be arrested early in the movement of the treadle the spring 64 may be subsequently compressed to a greater degree than if the link 33 be arrested at a later stage. Accordingly, if the driving and driven members have their surfaces 47 and 41 engaged (this causing an early arrest of the link 33) the subsequent compression of the spring may exert a heavy pressure between the driving and driven members so that their contact and engagement shall have maximum efficiency. On the other hand, when the driving and driven members have their surfaces 48 and 42 engaged (this causing arrest of the link 33 later in the movement of the treadle) the spring may press said members together less heavily at a time when their contact is more effective and heavy pressure is less important.

At the end of its throw the specific treadle shown will be locked by its pawl 68 and the spring 64 will be held under the prevailing compression, whether it be the greater compression for maintaining engagement of the driving and driven surfaces 47 and 41, or the less compression for maintaining engagement of the driving and driven surfaces 48 and 42. The engagements being maintained thus with the assistance of the spring, and the treadle and transmission mechanism being associated in part by the spring, renders the entire system elastic to a desirable degree, to compensate and yield to suit variations of throw resulting from any cause.

With a treadle mechanism embodying all the features described, the treadle may be given always the same throw e. g. until it strikes a permanent stop and the anticipated effect will be determined merely by the position of the driven member controlled by the hand lever 45 or any other desired substitute.

A further feature of the illustrative treadle mechanism is desirable to be used. It will be seen from Figs. 3 and 4, that the treadle when locked by its pawl and the toothed sector may be released by tilting the treadle 73 on its pivot, causing the lug 72 to depress the plunger 70 and rocking the pawl 68 out of engagement with the teeth. It is preferred that the treadle 73 stand always at substantially the same angle, in order to suit under all circumstances the natural position of the driver's foot.

Accordingly, the illustrative mechanism in Figs. 3 and 4 shows the toothed sector 67 constructed on a center 80, offset from the fulcrum 63 about which the pawl fulcrum 69 moves during the throw of the treadle. The result of this construction is that at the extreme of the treadle throw shown in Fig. 4, the pawl 68 has been rocked contra-clockwise from its initial position whereby the plunger 70 is considerably elevated beyond its original position relative to the treadle, so as to hold the latter at substantially the same angle which it has when the treadle is in normally inactive position.

It will be observed by comparison of Figs. 3 and 4 that the treadle 73 in both figures occupies substantially the same relation to the natural position of the driver's foot, so that the same movement upon his part would unlock the pawl 68 in either case. The advantage of this provision will be apparent to those familiar with treadle mechanism.

The driven member 40 is moved to and fro on its shaft 39 through the agency of a bell crank 43, controlled by a link 44. Preferably this controlling mechanism for the driven member is so associated with the corresponding controlling mechanism for the driving member, that said members require to be disengaged preparatory to each shift of the driven member to initiate a new speed or a reverse drive. This may be effected conveniently by an illustrative interlocking arrangement about to be described, the use of which may prevent movement of the member 40 axially on its shaft while engaged with the driving member.

Referring now to Figs. 6 and 7, the handle lever 45 is fixed upon the end of a shaft 100, suitably supported on the frame of the chassis. Fixed upon the opposite end of the shaft 100 is a sector 101, engaging by a pin 102 the forward end of the driven member controlling rod 44, shown also in Fig. 1. In Figs. 6 and 7 a treadle lever 103 merely typifies the treadle lever 60 shown in Figs. 1, 3 and 4 and any other similar controlling lever or device which may be employed for the same purpose. Said lever 103 or the lever 60 shown in Figs. 3 and 4 may be mounted on the stud 63 already referred to; and said lever is provided with a stop device or abutment 104 shown also on the lever 60 in Figs. 3 and 4. Appropriately mounted in a socket 105 supported on the frame of the chassis is a locking plunger 106 having an end shaped to engage notches 107, 108, 109 and 110 on the sector 101 which, as already described, has a fixed relation to the handle lever 45 and the driven member controlling link 44.

With the arrangement described, the driving and driven members are disengaged when the lever 103 occupies dotted line position in Fig. 7, that position corresponding to the one occupied by the lever 60 in Fig. 3. At such times the locking plunger 106 is held against the sector 101 by its springs 111 but if said plunger engage a notch on the sector 101 such engagement is preferably not secure enough to prevent movement of the sector and handle lever 45. Consequently, when the driving and driven members are disengaged the handle lever 45 may be moved to adjust the driven member to any desired position. The position illustrated in Fig. 7 corresponds to the reverse drive, that is to say when the locking plunger 106 engages the notch 110 the driven member 40 occupies the position shown in full lines in Fig. 1. When the handle lever 45 is turned clockwise in Fig. 7, until the locking plunger enters the notch 109, the driven member 40 will be moved toward the right in Fig. 1 to low speed forward drive position. When the notch 108 engages the locking plunger, the driven member 40 will stand in intermediate speed forward driving position; and when the notch 107 engages the locking plunger, the driven member 40 will stand in the high speed, bevel drive position shown in dotted lines in Fig. 1. When the desired adjustment of the handle lever 45 and its controlled driven member has been effected, the driving and driven members may be engaged by throwing the lever 103 from dotted line position, Fig. 7, to full line position, the result being similar to that already described in connection with the lever 60 in Figs. 3 and 4. Such movement of the lever 103 throws its stop device 104 into position at the rear of the locking plunger 106 and thereby holds the latter rigidly in engagement with the sector 101, preventing movement of the latter and the driven member until by returning the lever 103 to dotted line position in Fig. 7 and disengaging the driving and driven members, the stop device 104 is removed from operative relation with the locking plunger 106.

In Figs. 3 and 4 the lever 60 is shown as provided with a stop device 112 corresponding to the stop device 104 shown in Fig. 7. The device 112 for the lever 60 is shown also in Fig. 1, in its proper relation with a locking plunger 106, sector 101, shaft 100 and handle lever 45.

While the preceding description has sufficiently disclosed a single practicable embodiment of the invention, it is to be understood that said specific embodiment has been shown merely for purposes of illustration; and the scope of the invention is by no means essentially limited thereto. As will appear to those skilled in the art the invention is susceptible of embodiment in various forms differing from those specifically disclosed but which nevertheless are included within the proper scope of the invention. It is not indispensable that all the features of the invention be used conjointly, since they are capable of use separately to advantage.

I claim as my invention—

1. In a motor vehicle controlling mechanism, the combination of driving means, driven mechanism, and transmission means intermediate the same comprising a disk connected with the driving means and provided with a plane surface and a beveled surface surrounding and projecting rearwardly from said plane surface, and a rotatable member connected with said driven mechanism, said rotatable member having a cylindrical surface to coöperate with said plane surface for low speed forward driving at one side of the axis of rotation of said disk, and for reverse driving at the opposite side of said axis, and also having a beveled surface to coöperate with the said beveled surface of said disk for high speed forward driving at said first-mentioned side of said axis of rotation.

2. In a motor vehicle controlling mechanism, the combination of a driving shaft, a driven shaft and transmission means intermediate said shafts comprising a disk mounted upon the driving shaft and provided with a plane surface, and a beveled surface surrounding and projecting rearwardly from said plane surface, a rotatable member mounted upon the driven shaft and an adjustable stop upon said driven shaft and coöperating with said rotatable member, said rotatable member having a cylindrical surface to coöperate with said plane surface for low speed forward driving at one side of the axis of rotation of said disk and for reverse driving at the opposite side of said axis, and also having a beveled surface to coöperate with the beveled surface of said disk for high speed forward driving at said first-mentioned side of said axis of rotation.

3. In a motor vehicle controlling mechanism, the combination of a driving means, driven mechanism, and transmission means intermediate the same comprising a disk connected with the driving means and provided with a plane surface and a beveled surface surrounding and projecting rearwardly from said plane surface, and a rotatable member connected with said driven mechanism, said rotatable member having a cylindrical surface to coöperate with said plane surface for low speed forward driving at one side of the axis of rotation of said disk, and for reverse driving at the opposite side of said axis, and also having a beveled surface to coöperate with the said beveled surface of said disk for high speed forward driving at said first-mentioned side of said axis of rotation, and locking means to maintain said disk and rotatable member with their beveled surfaces in driving engagement.

4. In a motor vehicle controlling mechanism, the combination of driving means, driven mechanism and transmission means intermediate the same comprising a disk connected with the driving means and provided with a plane surface and a beveled surface surrounding and projecting rearwardly from said plane surface, and a rotatable member connected with said driven mechanism, said rotatable member having a cylindrical surface to coöperate with said plane surface for low speed forward driving at one side of the axis of rotation of said disk and for reverse driving at the opposite side of said axis, and also having a beveled surface to coöperate with the beveled surface of said disk for high speed forward driving at said first-mentioned side of said axis of rotation, and means to lock said disk and said rotatable member with the plane surface of one in engagement with the cylindrical surface of the other and also for locking the beveled surface of one in engagement with the beveled surface of the other.

5. In a motor vehicle controlling mechanism, the combination of a driving shaft, stationary journal means for said shaft, means to move said shaft axially in said stationary journal means, a driven shaft, and transmission means intermediate said shafts and comprising a disk mounted upon and axially movable with said driving shaft and having a plane surface and a beveled surface surrounding said plane surface, a rotatable member mounted upon said driven shaft and having a cylindrical surface to coöperate with said plane surface at both sides of the axis of rotation thereof for reverse driving and low speed forward driving respectively, and a beveled surface to coöperate with the said beveled surface of said disk for high speed forward driving.

6. In mechanism of the class described, the combination of a driving member, a driven member, starting and stopping means intermediate the same, having a variable throw, controlling means therefor having locking means to hold said controlling means in adjusted position, and cushioning means intermediate the starting and stopping means and controlling means, to compensate for variations in throw.

7. In a motor vehicle controlling mechanism, the combination of a driving shaft, a driven shaft, transmission mechanism intermediate said shafts, and comprising a disk mounted upon said driving shaft and provided with a plane surface and a surrounding bevel surface, and a rotatable member mounted upon said driven shaft and having a cylindrical surface to coöperate with said plane surface for low speed forward driving at one side of the axis of rotation of said disk and for reverse driving at the opposite side of said axis, and also having a bevel surface to coöperate with the bevel surface of said disk for high speed forward driving at said first-mentioned side of said axis of rotation, controlling means to determine the speed adjustment of the transmission mechanism, starting and stopping means, and means to connect said controlling means and the starting and stopping means for governing one by the other.

8. In a motor vehicle controlling mechanism, the combination of a driving shaft, a driven shaft, transmission mechanism intermediate the same and comprising a driving disk upon the driving shaft, provided with a plane surface and a surrounding bevel surface, and a rotatable member upon the driven shaft provided with a cylindrical surface and an adjacent bevel surface, said cylindrical surface engaging with the said plane surface upon both sides of the axis of rotation of the said disk for low speed forward driving and reverse driving respectively, and the said bevel surface of the rotatable member engaging with the surrounding bevel surface of the said disk for high speed forward driving, speed adjusting mechanism, separate controlling means for said transmission mechanism and speed adjusting mechanism respectively, a notched sector connected to one of said controlling means and notch engaging locking means governed by the other controlling means for locking said sector to its controlling means.

9. In a motor vehicle controlling mechanism, the combination of coöperating friction driving and driven members, one of them having active friction surfaces to coöperate respectively with the other member upon different respective relative movements of the two members; controlling means to cause said movements; and mechanism intermediate the controlling means and said friction member producing different pressures on the two frictional surfaces with substantially the same pressure of the controlling means.

10. In a motor vehicle controlling mechanism, the combination of coöperating friction driving and driven members, one of them having a low speed friction surface and a high speed friction surface to coöperate respectively with the other member upon different relative movements of the two members; a controlling member to cause such relative movement; and mechanism intermediate the controlling means and said friction members producing different pressures on the two frictional surfaces with substantially the same pressure of the controlling means.

11. In a motor vehicle controlling mechanism, the combination of coöperating friction driving and driven members, one of them having a low speed friction surface and a high-speed friction surface to coöperate respectively with the other member upon different relative movements of said members; a controlling member to cause such movement; and mechanism intermediate the controlling member and the friction members causing increased pressure between the latter for the low speed engagement.

12. In a motor vehicle controlling mechanism, the combination of coöperating friction driving and driven members, one of them having a low speed friction surface and a high speed friction surface to engage respectively with the other member upon different relative movements of said members, and mechanism intermediate the controlling member and the friction members permitting the former to have movements of the same extent irrespective of varying relative movements of the friction members, said mechanism causing increased pressure between the friction members upon movement thereof to effect low speed engagement.

13. In a motor vehicle controlling mechanism, the combination of coöperating friction driving and driven members, one of said members comprising a disk having a plane face and a beveled face to coöperate respectively with the other member upon different relative movements of the two members, a controlling member to cause such relative movement, and mechanism intermediate the controlling member and said friction member producing different pressures on the friction surfaces of said friction members with substantially the same pressure of the controlling means.

14. In a motor vehicle controlling mechanism, the combination of coöperating friction driving and driven members, one of them having active friction surfaces to coöperate respectively with the other member upon different respective relative movements of the two members; controlling means to cause said movements; and a yielding medium intermediate the controlling member and said friction members permitting the former to have movements of substantially the same extent irrespective of varying relative movement of the friction members.

15. In a motor vehicle controlling mechanism, the combination of coöperating friction driving and driven members, one of them having a low speed friction surface and a high speed friction surface to coöperate respectively with the other member upon different relative movements of the two members; a controlling member to cause such relative movement; and a yielding medium intermediate the controlling member and said friction members, permitting the former to have movements of substantially the same extent irrespective of varying relative movement of said friction members.

16. In a motor vehicle controlling mechanism, the combination of coöperating friction driving and driven members, one of them having a low speed friction surface and a high speed friction surface to coöperate respectively with the other member upon different relative movements of said members; a controlling member to cause such movement; and a yielding medium intermediate the controlling member and the friction members causing increased pressure between the latter for the low speed engagement.

17. In a motor vehicle controlling mechanism, the combination of coöperating friction driving and driven members, one of them having a low speed friction surface and a high speed friction surface to engage respectively with the other member upon different relative movements of said members; and a yielding medium intermediate the controlling member and the friction members permitting the former to have movements of the same extent irrespective of varying relative movement of the friction members, said yielding medium causing increased pressure between the friction members upon movement thereof to effect low speed engagement.

18. In a motor vehicle controlling mechanism, the combination of coöperating friction driving and driven members, one of said members comprising a disk having a plane face and a bevel face to coöperate respectively with the other member upon different relative movements of the two members; a controlling member to cause such relative movement; and a yielding medium intermediate the controlling member and said friction members permitting the former movements of substantially the same extent irrespectively of varying relative movement of the friction members.

19. In a motor vehicle controlling mechanism, the combination of driving means; driven means; starting and stopping means intermediate the same having variable throws; controlling means therefor to move the starting and stopping means through its variable throws, including means to increase the pressure on the starting and stopping means for one of its variable throws.

20. In a motor vehicle controlling mechanism, the combination of a driving means; driven mechanism; governing means intermediate the same having variable throws; a controller therefor to move the governing means through its variable throws; and means operated by the controller to apply a maximum pressure to the governing means after its minimum throw.

21. In a motor vehicle controlling mechanism, the combination of driving means; driven mechanism; transmission means intermediate the same, including disk and roller friction elements an endwise movable shaft to start and stop the transmission; stationary journal means and a separated slip-joint to guide said shaft and support it in its movement; controlling means to govern endwise movement of said shaft; and locking means for the controlling means to hold said shaft in position.

22. In a motor vehicle controlling mechanism, the combination of driving means; driven mechanism; transmission mechanism intermediate the same including alternatively operable pairs of coöperating friction surfaces; controlling means, having a foot-receiving portion, to control engagement of said pairs of friction surfaces; locking means for the controlling means; and provision for unlocking the controlling means by substantially uniform movement of the foot receiving portion regardless of the position of the former.

23. In a motor vehicle controlling mechanism, the combination of driving means; driven mechanism; transmission mechanism intermediate the same; and controlling means therefor including means governed by the operator, and auxiliary power-multiplying means additional thereto and acting subsequently to the initial movement of the controlling means.

24. In a motor vehicle controlling mechanism, a driving system; a driven system; and means for connecting said systems by pressure including a device governed by the operator, and additional auxiliary pressure-augmenting means to maintain pressure between the driving and driven systems and acting subsequently to the initial movement of said device.

25. In a motor vehicle controlling mechanism, a driving system; a driven system; and means for connecting said systems by pressure including a device governed by the operator, and additional yielding auxiliary pressure-augmenting means to maintain pressure yieldingly between the driving and driven systems.

26. In a motor vehicle controlling mechanism, the combination of a driving system; a driven system; means initially to engage said systems; and subsequently acting additional auxiliary power-multiplying means coöperating therewith to complete and maintain the engagement between said systems.

27. In a motor vehicle controlling mechanism, the combination of a driving system; a driven system; a lever means for engaging said systems initially; and subsequently acting means to augment the power of said lever means to complete and maintain the engagement of said systems.

28. In a motor vehicle controlling mechanism, the combination of a driving system; a driven system; transmission mechanism intermediate the same; controlling means therefor; and spring controlled toggle means intermediate the controlling means and transmission mechanism.

29. In a motor vehicle controlling mechanism, the combination of a driving system; a driven system; transmission mechanism intermediate the same; lever means to control the transmission mechanism; an elbow intermediate the lever means and transmission mechanism to be moved toward alinement by the former to operate the latter; and auxiliary means to act upon the elbow to oppose said alinement.

30. In a motor vehicle controlling mechanism, the combination of a driving system; a driven system; transmission mechanism intermediate the same; a controlling lever therefor; and a connection intermediate the lever and transmission mechanism; arranged to approach the fulcrum of said lever during operation of the latter.

31. In a motor vehicle controlling mechanism, the combination of transmission means including alternatively operative bevel friction driving surfaces and disk-and-roller driving surfaces; a controller to initiate operation of said surfaces; and pressure means to apply different pressures for the respective sets of engaging surfaces under substantially the same pressure exerted at the controller.

In testimony whereof, I have signed my name to this specification, in the presence of two subscribing witnesses.

FRANK D. HOWE.

Witnesses:
LAURENCE A. JANNEY,
ROBERT H. KAMMLA.